United States Patent
Sakamoto

(10) Patent No.: US 7,580,141 B2
(45) Date of Patent: Aug. 25, 2009

(54) IMAGE FORMING APPARATUS

(75) Inventor: Daiki Sakamoto, Numazu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 684 days.

(21) Appl. No.: 10/940,067

(22) Filed: Sep. 13, 2004

(65) Prior Publication Data

US 2006/0055957 A1 Mar. 16, 2006

(51) Int. Cl.
*G06K 15/00* (2006.01)
(52) U.S. Cl. .................. 358/1.14; 358/1.13; 399/23; 399/24
(58) Field of Classification Search ............... 358/1.13, 358/1.14
See application file for complete search history.

(56) References Cited

U.S. PATENT DOCUMENTS

| | | | | |
|---|---|---|---|---|
| 5,636,032 | A * | 6/1997 | Springett | 358/296 |
| 6,490,053 | B1 * | 12/2002 | Takahashi et al. | 358/1.18 |
| 6,559,967 | B1 * | 5/2003 | Akiba et al. | 358/1.16 |
| 6,621,592 | B1 * | 9/2003 | Takayama et al. | 358/1.16 |
| 6,891,633 | B1 * | 5/2005 | Hayward et al. | 358/1.15 |
| 6,927,866 | B2 * | 8/2005 | Konishi | 358/1.13 |
| 2002/0167683 | A1 * | 11/2002 | Hanamoto et al. | 358/1.14 |

FOREIGN PATENT DOCUMENTS

| | | |
|---|---|---|
| CN | 1456945 A | 11/2003 |
| JP | 6-064252 | 3/1994 |
| JP | 6-64252 | 3/1994 |
| JP | 06-064252 * | 8/1994 |
| JP | 9-188039 | 7/1997 |
| JP | 2003-323092 | 11/2003 |

OTHER PUBLICATIONS

State Intellectual Property Office of P.R.C. Notification of First Office Action for Application 200510102855.6, Nov. 23, 2007.

* cited by examiner

*Primary Examiner*—Twyler L Haskins
*Assistant Examiner*—Dennis Dicker
(74) *Attorney, Agent, or Firm*—SoCal IP Law Group LLP; Steven C. Sereboff; John E. Gunther

(57) ABSTRACT

When an image forming apparatus receives print data to which page quantity information has been added from an external apparatus, it decides by which emulation among a plurality of types of emulations to interpret the print data, and outputs the print data emulation-processed depending on the decision to an engine which forms an image for each page. Further, when it is determined that the page quantity of the print data outputted to the engine is larger than the page quantity indicated by the page quantity information, the apparatus instructs the engine to suspend image formation.

3 Claims, 5 Drawing Sheets

IMAGE FORMING APPARATUS

BACKGROUND OF THE INVENTION

1. Field of the Invention

The present invention relates to an image forming apparatus for performing emulation processing and forming an image for each page on the basis of the processing result.

2. Description of the Related Art

When an image forming apparatus such as a printing apparatus receives a print job which cannot be interpreted even using a plurality of mounted emulations, it generally determines that it has received print data described in plain text. Then, the apparatus prints out all the received print data as plain text. This wastes recording materials, such as printing sheets or toner. The following technique has been known in order to avoid such a situation.

Jpn. Pat. Appln. KOKAI Publication No. 9-188039 describes an apparatus where a determination as to whether an emulation of print data received by a printing apparatus can be interpreted by an emulation mounted on the printing apparatus and a selection of the emulation are performed in predetermined unit such as page or time. As compared with the case where a determination is conventionally made only at the time of starting printing, the determination and the selection are performed in a predetermined unit, so that the printing apparatus can eliminate the waste of printing sheets etc., and can normally print out the print data possibly.

However, the technique is directed at avoiding selection error of an emulation among emulations mounted on the image forming apparatus. In this technique, for example, when the image forming apparatus receives print data described in a non-mounted page description language, an image which a user does not intend is formed, and recording media such as printing sheets or recording materials such as toner are wasted as conventionally.

Therefore, since an image which the user does not intend is formed as a result of the interpretation of the print data by the emulation different from the emulation of the print data, there is a need for an image forming apparatus capable of avoiding the waste of recording media for forming an image and recording materials such as toner.

BRIEF SUMMARY OF THE INVENTION

According to an aspect of the present invention, an image forming apparatus comprises: a receiving portion configured to receive print data to which page quantity information has been added from an external apparatus; a deciding portion configured to decide by which emulation among a plurality of types of emulations to interpret the received print data; an engine which forms an image of print data for each page; an output portion configured to output the print data emulation-processed depending on the decision of the deciding portion to the engine for each page; a determining portion configured to determine whether or not the page quantity of the print data outputted by the output portion is larger than the page quantity indicated by the page quantity information; and a suspension instructing portion configured to instruct the engine to suspend image formation when the determining portion determines that the page quantity of the outputted print data is larger than the page quantity indicated by the page quantity information.

Objects and advantages of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

DETAILED DESCRIPTION OF THE INVENTION

Figure 1:
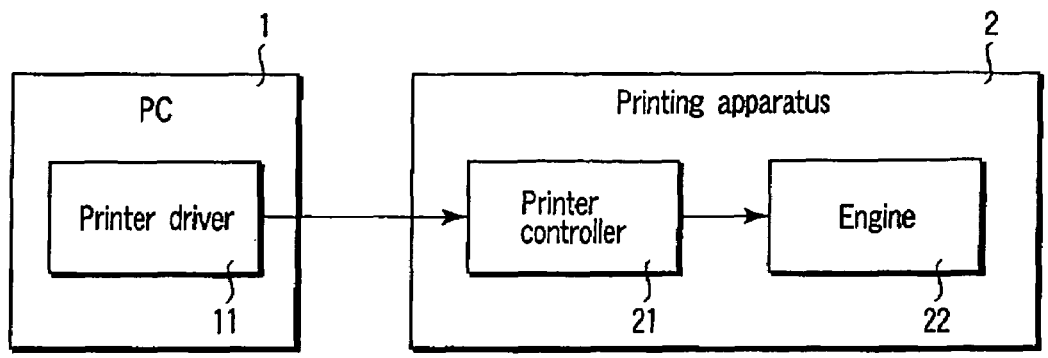
FIG. 1 is a diagram showing a flow of print data according to one embodiment of the present invention.

One embodiment according to the present invention will be described below with reference to the drawing.

FIG. 1 is a diagram showing a flow of print data. A personal computer (PC) 1 which is a print client and a printing apparatus 2 are, though not illustrated, communicably connected with each other via a local area network (LAN). The PC 1 comprises a printer driver 11. The printing apparatus 2 is, for example, an image forming apparatus for forming an image through an electrophotographic process, and is mainly divided into a printer controller 21 and an engine 22.

The printer driver 11 performs a processing of converting data of pages in a designated print range of an image or document displayed on an application of the PC 1 into data interpretable by the printer controller 21. The thus converted data is transmitted to the printer controller 21 as print data.

The printer controller 21 mounts interpreters according to a plurality of types of emulations thereon. When the printer controller 21 receives the print data from the printer driver 11, it decides by which emulation among the several types of emulations to interpret the print data. The printer controller 21 interprets the print data using an interpreter depending on the decision result. The printer controller 21 converts the interpreted print data into data printable by the engine 22 and outputs it to the engine 22 for each page.

The engine 22 performs printing for each page on the basis of the data output from the printer controller 21.

Figure 2:
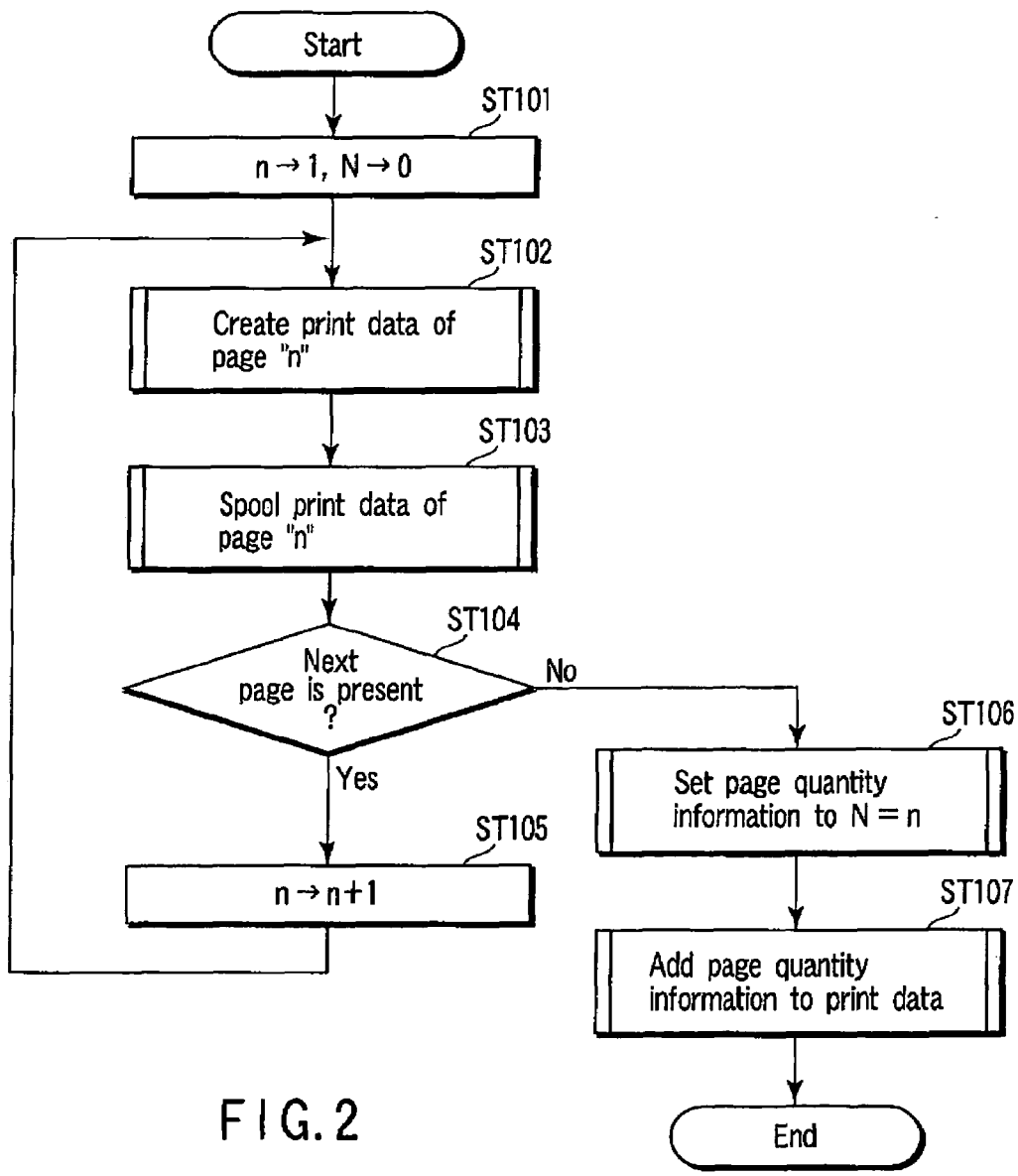
FIG. 2 is a flowchart showing a processing to be performed by a printer driver.

FIG. 2 is a flowchart showing a processing to be performed by the printer driver 11 when converting print data into data interpretable by the printer controller 21.

The printer driver 11 first sets a variable "n" to 1 and a variable "N" to 0 (ST101). The variable "n" is used for counting the page quantity of the print data. The variable "N" is page quantity information to be used for indicating the total page quantity of the print data.

Figure 3:
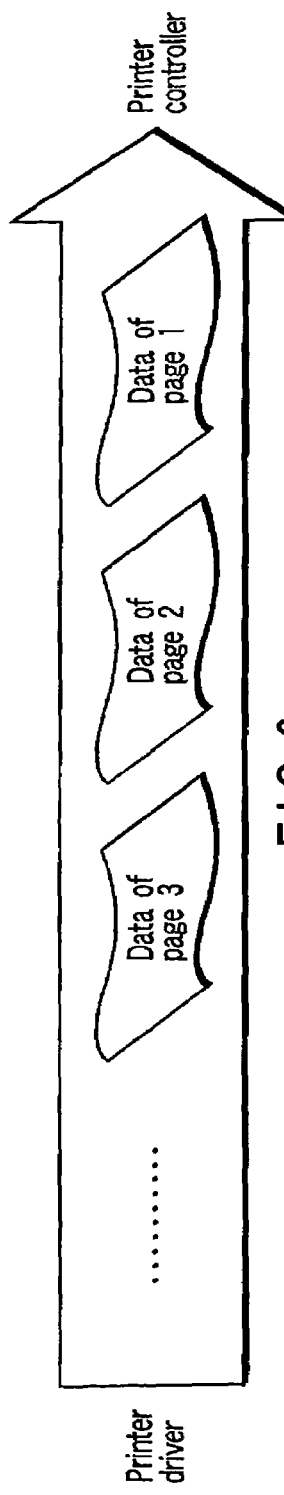
FIG. 3 is a conceptual diagram showing initial part of the print data when transmitting the spooled print data.

The printer driver 11 converts data of a document or image of page "n" to create print data on the basis of the designated emulation (ST102), and spools the print data in an HDD (not shown) of the PC 1 (ST103). Then, the printer driver 11 determines based on the designated print range whether or not the next page is present (ST104). When it is determined that the next page is present, "1" is added to the variable "n" (ST105), and the processing returns to the processing in step ST102 of creating print data of page "n". These processings are performed so that all the pages in the designated print range are created as the print data on the basis of the designated emulation and spooled in the HDD. In step ST105, each time the print data of each page in the designated print range is created, the page quantity is counted in the variable "n". The data for each page sequentially spooled in the HDD is sequentially outputted to the printer controller 21 in the printing apparatus 2 as shown in FIG. 3.

Figure 4:
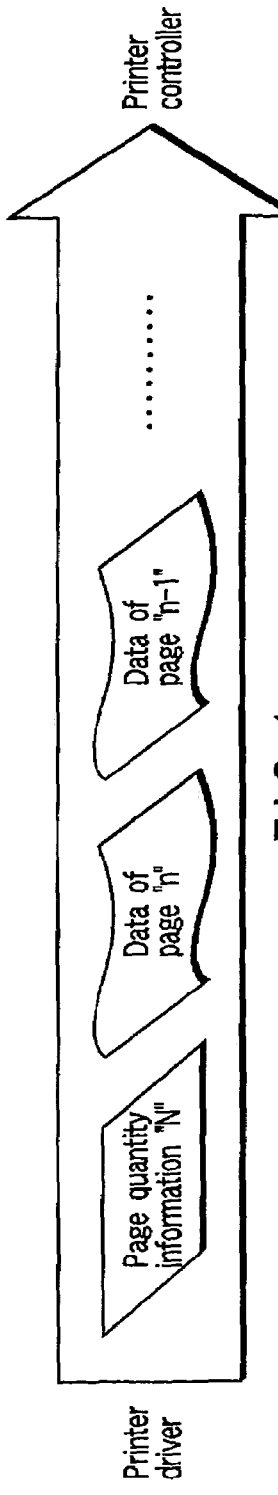
FIG. 4 is a conceptual diagram showing last part of the print data and page quantity information when transmitting the spooled print data.

On the other hand, when it is determined in step ST104, on the basis of the designated print range, that the next page is not present, the printer driver 11 sets the page quantity information "N" to "n". Namely, the printer driver 11 sets the counted page quantity indicated by the variable "n" as the page quantity information "N" (ST106). Subsequently, the printer driver 11 adds the page quantity information "N" as data next to the last page of the print data spooled in the HDD (ST107). Thus, as shown in FIG. 4, the page quantity information "N" is transmitted to the printer controller 21 next to the data of the last page of the print data spooled in the HDD (for example, the data of page "n"). When the print data added with the page quantity information "N" is transmitted to the printer controller 21 in this way, the processing by the printer driver 11 is terminated.

Figure 5:
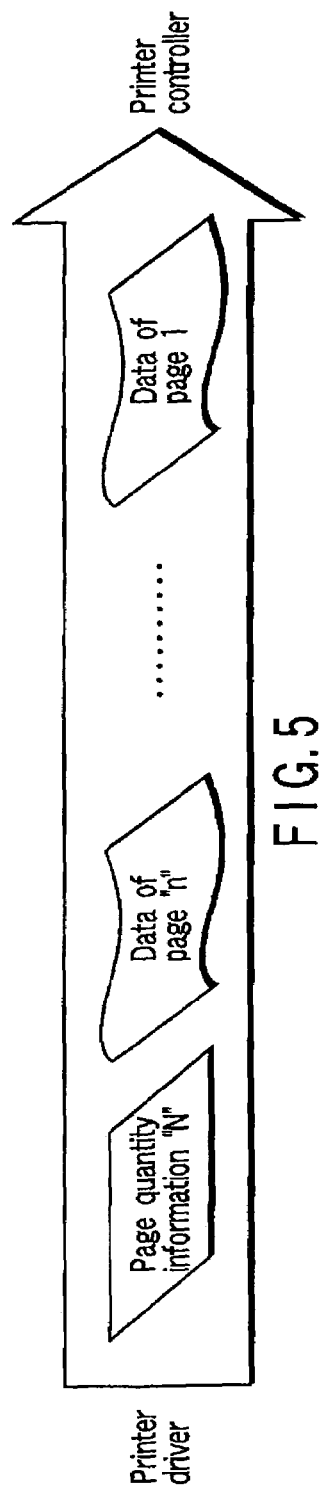
FIG. 5 is a conceptual diagram showing the entire print data to which the page quantity information has been added.

FIG. 5 is a diagram conceptually showing the print data added with the page quantity information "N", the print data to be transmitted from the printer driver 11 to the printer controller 21 through the aforementioned processing. For example, when pages 1 to "n" are designated as the print range, data of each page from the first page "1" to the last page "n" is assumed as image data. Then, the page quantity information "N" is added to the end of the image data.

Figure 6:
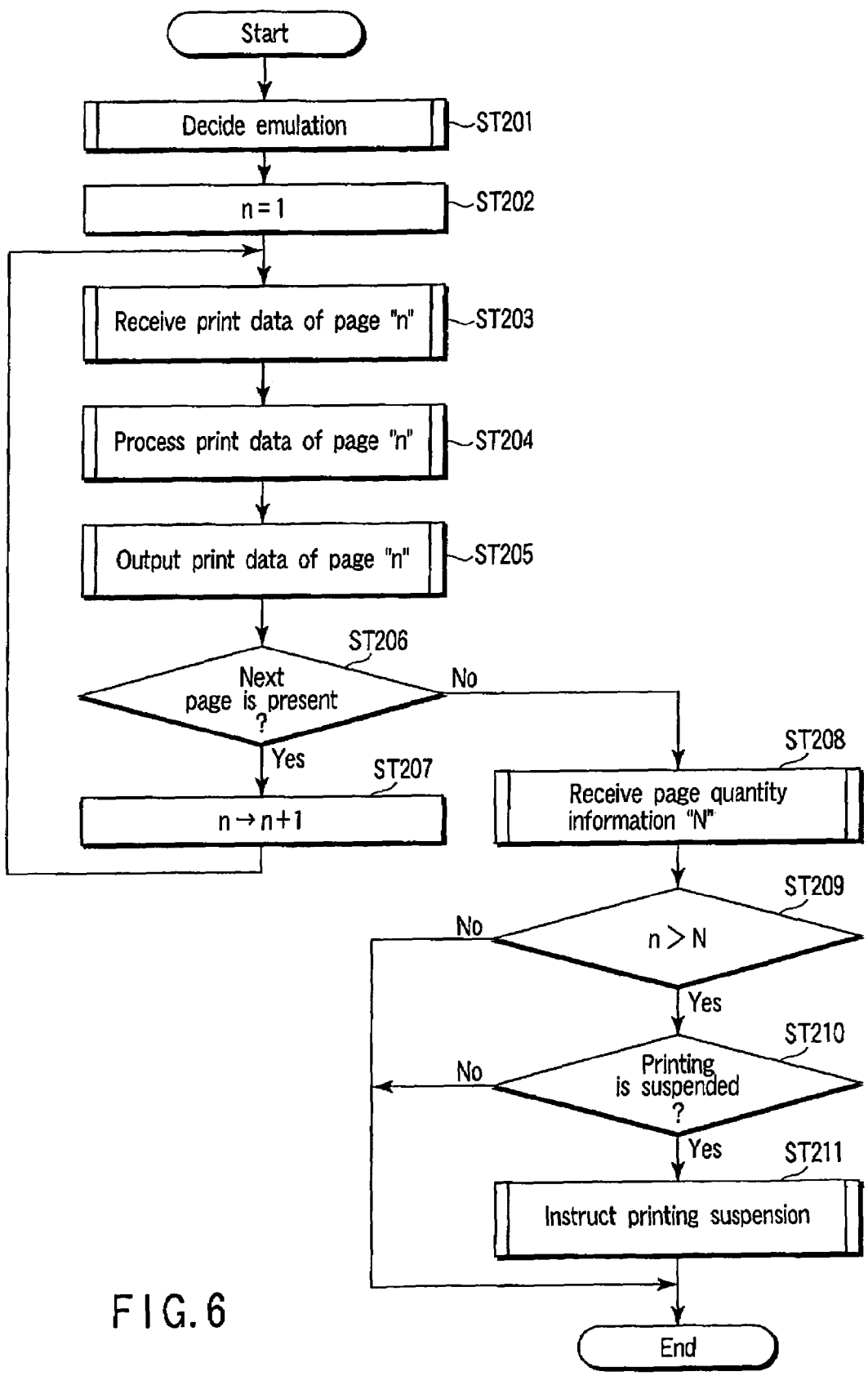
FIG. 6 is a flowchart showing a processing to be performed by a printer controller.

FIG. 6 is a flowchart showing a processing to be performed by the printer controller 21 when receiving the print data added with the page quantity information "N".

When the printer controller 21 receives the print data added with the page quantity information "N", it decides what the emulation of the received print data is, that is, in which page description language the received print data is described. Generally, the emulation of the received print data is decided to be any one of the several types of emulations mounted (ST201).

Then, the printer controller 21 sets the variable "n" to "1" (ST202). This variable "n" is used for counting the page quantity of the print data outputted to the engine 22.

When the printer controller 21 receives the print data of page "n" (ST203), it interprets the print data of page "n" using an interpreter depending on the decided emulation (ST204). Then, the printer controller 21 converts the interpreted data of page "n" into data printable by the engine 22, and outputs it to the engine 22 (ST205). Then, the printer controller 21 determines whether or not the next page is present in the received print data (ST206). When it is determined that the next page is present, the printer controller 21 adds "1" to the variable "n" (ST207), and the processing returns to the processing in step ST203 of receiving print data of page "n". These processings are performed so that the data of all the pages in the print data is sequentially converted and outputted to the engine 22. The page quantity is counted in the variable "n" each time the print data of each page is outputted to the engine 22.

On the other hand, when it is determined in step ST206 that the next page is not present in the print data, the printer controller 21 receives the page quantity information "N" added to the end of the print data (ST208). Then, the printer controller 21 determines whether or not the variable "n" in which the page quantity of the print data outputted to the engine 22 is counted is larger than the page quantity indicated by the page quantity information "N" (ST209). The reason why the counted variable "n" and the page quantity information "N" are compared with each other is as follows.

When the emulation decided in step ST201 is correct and the print data is interpreted by the appropriate emulation, the counted variable "n" and the page quantity information "N" must be equal. However, when the print data of the emulation which is not mounted on the printer controller 21 is received, the variable "n" is generally larger than the page quantity information "N" which originally indicates the correct page quantity. This is because the print data is interpreted as plain text by a different emulation, and thereby a page description language to be outputted as an image as a result of interpretation is outputted as it is or because a specific data is interpreted as a page break code which printer driver does not intend as a result of incorrect interpretation of the print data.

Therefore, since the selected emulation is correct when NO in the determination in step ST209, the printer controller 21 terminates the processing. Further, when YES in the determination in step ST209, the print data of the emulation which is not mounted on the printer controller 21 has been interpreted or the print data has been incorrectly interpreted. Thus, the printer controller 21 determines whether to instruct printing suspension. In other words, the printer controller 21 determines whether to immediately suspend printing of unprinted pages in the engine 22 in the print data already outputted to the engine 22 (ST210). For example, when an instruction of suspension is received from a control panel (not shown) in the printing apparatus 2, the printer controller 21 instructs the engine 22 to suspend printing. Further, when an unprinted page is present in the engine 22 (which can be determined by comparing a variable "m" described later with the variable "n", for example), the printer controller 21 may instruct the engine 22 to immediately suspend printing.

When NO in the determination in step ST210, the printer controller 21 terminates the processing. When YES in the determination in step ST210, the printer controller 21 outputs a command of instructing to suspend printing to the engine 22 (ST211) and terminates the processing.

Figure 7:
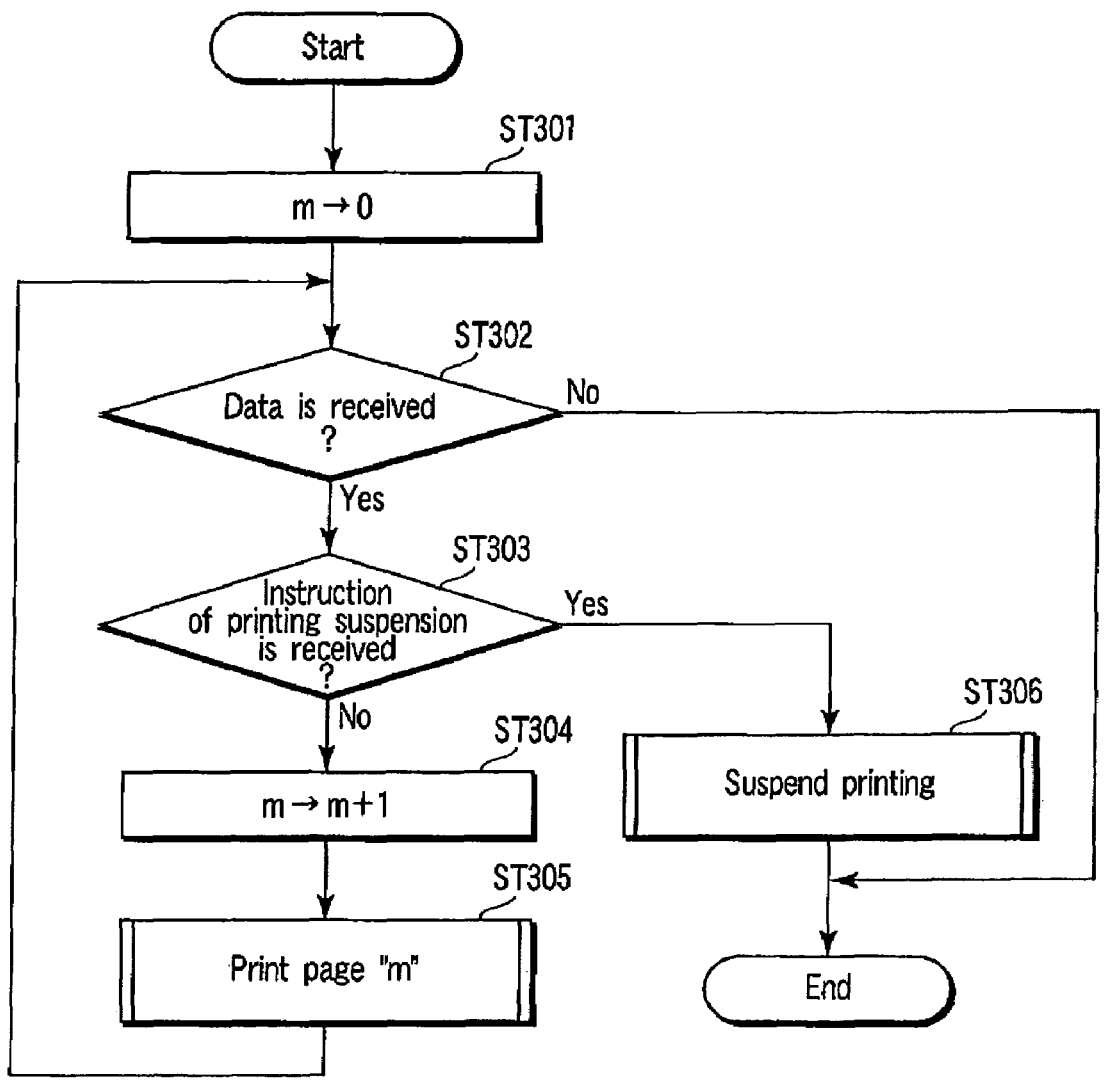
FIG. 7 is a flowchart showing a processing to be performed by an engine.
Figure 8:
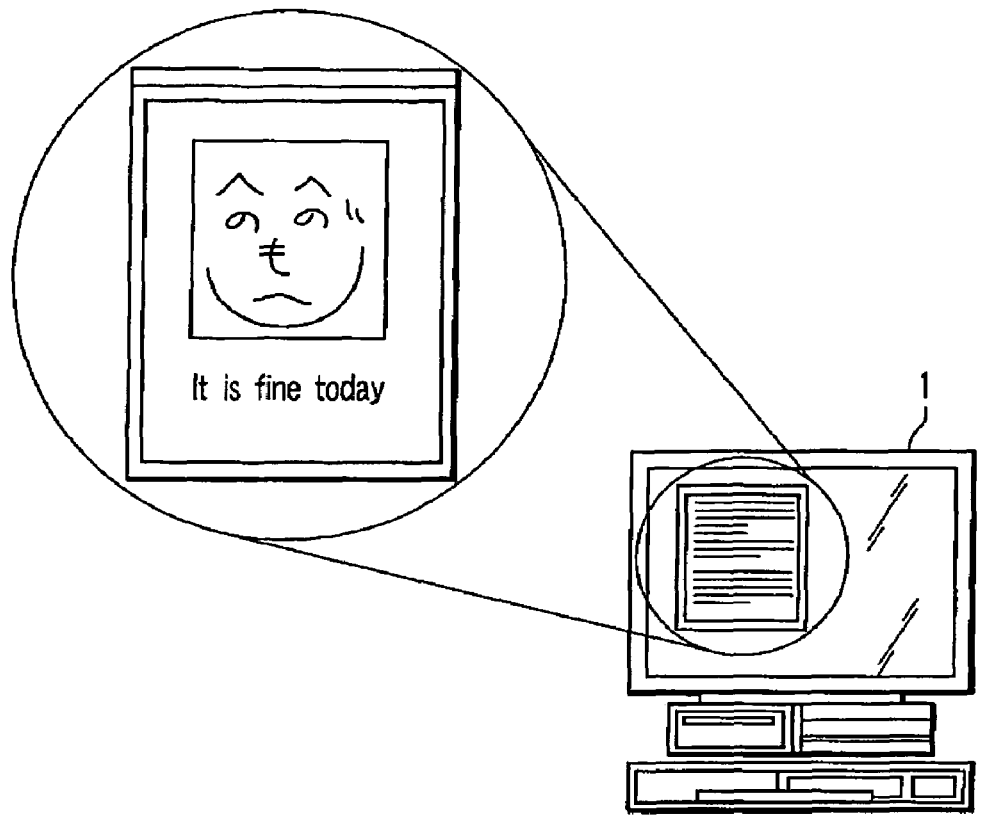
FIG. 8 is a diagram showing an image of data displayed on a PC to be printed.

FIG. 7 is a flowchart showing a processing to be performed by the engine 22 when receiving data in a printable form from the printer controller 21.

The engine 22 sets the variable "m" to "0" in the standby state (ST301). Then, the engine 22 determines whether or not it has received the data outputted from the printer controller 21 in the step ST205 (ST302). When NO in the determination, the engine 22 terminates the processing. When YES in the determination, the engine 22 determines whether or not it has received the instruction of printing suspension outputted from the printer controller 21 in the step ST211 (ST303). When NO in the determination, the engine 22 adds "1" to the variable "m (ST304)", and prints out the data of page "m" (ST305). Then, the processing returns to step ST302. The engine 22 prints out the data sequentially outputted from the printer controller 21 for each page through these processings. On the other hand, when YES in the determination in step ST303, the engine 22 immediately suspends the printing (ST306), and terminates the processing.

Next, there will be described an operation when the emulation of the print data created in the printer driver 11 is not mounted on the printer controller 21 in the printing apparatus 2 when printing out data such as an image or document displayed on the screen of the PC 1 using the printing apparatus 2.

Figure 9:
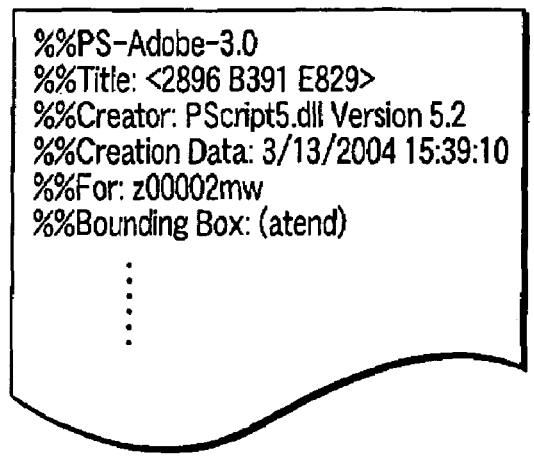
FIG. 9 is a diagram schematically showing a structure of the print data.

When an image or document is displayed on the screen of the PC 1, the printer driver 11 performs a processing of converting the data corresponding to an image or document into the print data described in the page description language as shown in FIG. 9 on the basis of the user's instruction. At this time, if a user makes a setting mistake, the printer driver 11 is instructed to process an emulation which is not mounted on the printing apparatus 2. The printer driver 11 performs the processing based on the instruction, and transmits the print data added with the page quantity information in the designated range to the printer controller 21.

Since the printer controller 21 cannot interpret the received print data using the mounted emulation, it processes the print data as plain text and sequentially outputs the data of each page to the engine 22.

When the engine 22 receives the data for each page, it sequentially performs printing based on the data. At this time, the data having a large quantity of pages is outputted to the engine 22 because it is the plain text. Generally, a time for performing processing of data by the printer controller 21 is shorter than a time for performing printing of each page based on the data for each page received by the engine 22. Therefore, when an emulation which is not mounted on the printer controller 21 is selected, the printer controller 21 can output the instruction of printing suspension to the engine 22 while the engine 22 is performing the printing based on the data. The engine 22 suspends the printing on receiving the instruction of printing suspension.

Therefore, the printing apparatus 2 can avoid the waste of recording media for forming an image or recording materials such as toners caused by the fact an image which the user does not intend is formed as a result of the interpretation of the print data by an emulation different from the emulation of the print data.

Further, the page quantity information "N" is configured to be added to the end of the print data. Thus, the printer controller 21 can output the data to the engine 22 sequentially in order of processed pages. Therefore, even when the page quantity information "N" is configured to be added to the end of the print data, a time required for the printing by the printing apparatus 2 is not prolonged as compared with that of the conventional art.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and their equivalents thereof.

What is claimed is:

1. An image forming apparatus comprising:
   a receiving portion configured to receive, from an external apparatus, print data wherein page quantity information indicating a total page quantity of the print data has been added at the end of the print data;
   a deciding portion configured to decide by which emulation among a plurality of types of emulations interprets the received print data;
   an engine which forms an image of print data for each page;
   an output portion configured to output the print data emulation-processed depending on the decision of the deciding portion to the engine for each page;
   a counter configured to count the page quantity of the outputted print data, wherein the counter counts when the emulation interprets each page of data;
   a determining portion configured to determine whether or not the page quantity of the print data outputted by the output portion is larger than the total page quantity indicated by the page quantity information; and
   a suspension instructing portion configured to instruct the engine to suspend image formation when the determining portion determines that the page quantity of the outputted print data is larger than the total page quantity indicated by the page quantity information and the receiving portion has received an instruction for suspending the printing from a control panel.

2. An image forming apparatus comprising:
   means for receiving, from an external apparatus, print data, wherein page quantity information indicating a total page quantity of the print data has been added at the end of the print data;
   means for deciding which emulation among a plurality of types of emulations to interprets the received print data;
   an engine which forms an image of print data for each page;
   means for outputting the print data emulation-processed depending on the decision of the deciding means to the engine for each page;
   means for counting the page quantity of the outputted print data, wherein the means for counting counts when the emulation interprets each page of data;
   means for determining whether or not the page quantity of the outputted print data is larger than the total page quantity indicated by the page quantity information; and
   means for instructing the engine to suspend image formation when the determining means determines that the page quantity of the outputted print data is larger than the page quantity indicated by the page quantity information and the receiving portion has received an instruction for suspending the printing from a control panel.

3. A method for controlling image formation by an image forming apparatus, the method comprising:
   receiving, from an external apparatus, print data, wherein page quantity information indicating a total page quantity of the print data has been added at the end of the print data;
   deciding which emulation among a plurality of types of emulations interprets the print data;
   emulation-processing the print data depending on the decision for each page;
   outputting the processed print data to an engine which forms an image of print data for each page;
   counting the page quantity of the outputted print data, wherein the means for counting counts when the emulation interprets each page of data;
   determining whether or not the page quantity of the print data outputted to the engine is larger than the total page quantity indicated by the page quantity information; and
   instructing the engine to suspend image formation when the page quantity of the outputted print data is determined to be larger than the total page quantity indicated by the page quantity information and an instruction for suspending the printing has been received from a control panel.

* * * * *